US011850755B2

(12) United States Patent
Jung et al.

(10) Patent No.: US 11,850,755 B2
(45) Date of Patent: Dec. 26, 2023

(54) VISUALIZATION AND MODIFICATION OF OPERATIONAL BOUNDING ZONES USING AUGMENTED REALITY

(71) Applicant: Fanuc America Corporation, Rochester Hills, MI (US)

(72) Inventors: Derek Jung, Clinton Township, MI (US); Bruce Coldren, West Bloomfield, MI (US); Sam Yung-Sen Lee, Rochester Hills, MI (US); Leo Keselman, Ferndale, MI (US); Kenneth W. Krause, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 271 days.

(21) Appl. No.: 16/453,811

(22) Filed: Jun. 26, 2019

(65) Prior Publication Data

US 2019/0389066 A1 Dec. 26, 2019

Related U.S. Application Data

(60) Provisional application No. 62/690,125, filed on Jun. 26, 2018.

(51) Int. Cl.
*B25J 9/16* (2006.01)
*G06T 7/73* (2017.01)
(Continued)

(52) U.S. Cl.
CPC ............. *B25J 9/1674* (2013.01); *B25J 9/163* (2013.01); *B25J 9/1661* (2013.01);
(Continued)

(58) Field of Classification Search
CPC ........ B25J 9/1674; B25J 9/1661; B25J 9/163; B25J 9/1666; B25J 9/1676; B25J 13/086;
(Continued)

(56) References Cited

U.S. PATENT DOCUMENTS

| 5,646,844 A | 7/1997 | Gudat et al. |
| 7,664,570 B2 * | 2/2010 | Suita ..................... B25J 9/1666 |
| | | 700/245 |

(Continued)

FOREIGN PATENT DOCUMENTS

JP 2017164902 A 9/2017

OTHER PUBLICATIONS

Montfort International LTEE; Pilz—Safety Eye video. https://www.youtube.com/watch?v=ZO003ICfebE. Published on Aug. 7, 2009. www.prismonth.com.

*Primary Examiner* — Abby Y Lin
*Assistant Examiner* — Esvinder Singh
(74) *Attorney, Agent, or Firm* — John A. Miller; Shumaker, Loop & Kendrick LLP

(57) ABSTRACT

An augmented reality (AR) system for visualizing and modifying robot operational zones. The system includes an AR device such as a headset in communication with a robot controller. The AR device includes software for the AR display and modification of the operational zones. The AR device is registered with the robot coordinate frame via detection of a visual marker. The AR device displays operational zones overlaid on real world images of the robot and existing fixtures, where the display is updated as the user moves around the robot work cell. Control points on the virtual operational zones are displayed and allow the user to reshape the operational zones. The robot can be operated during the AR session, running the robot's programmed motion and evaluating the operational zones. Zone violations are highlighted in the AR display. When zone definition is complete, the finalized operational zones are uploaded to the robot controller.

22 Claims, 7 Drawing Sheets

US 11,850,755 B2
Page 2

(51) Int. Cl.
*G02B 27/00* (2006.01)
*G06T 19/00* (2011.01)

(52) U.S. Cl.
CPC ............ *G02B 27/0093* (2013.01); *G06T 7/73* (2017.01); *G06T 19/006* (2013.01)

(58) Field of Classification Search
CPC ...... B25J 13/089; B25J 9/1671; B25J 9/1605; G06T 7/73; G06T 19/006; G06T 13/40; G06T 7/74; G02B 27/0093; G02B 27/017; G05B 2219/32014; G05B 2219/36432; G05B 2219/39449; G05B 2219/39451; G05B 2219/40131; G05B 2219/37631; G05B 2219/39384; G05B 2219/40478; G05B 2219/49139; G05B 2219/49157
See application file for complete search history.

(56) References Cited

U.S. PATENT DOCUMENTS

| | | | |
|---|---|---|---|
| 9,292,085 B2 * | 3/2016 | Bennett | G06F 3/017 |
| 2004/0189631 A1 | 9/2004 | Kazi et al. | |
| 2009/0222149 A1 | 9/2009 | Murray et al. | |
| 2016/0158937 A1 * | 6/2016 | Kamoi | B25J 9/1628 |
| | | | 700/259 |
| 2016/0207198 A1 * | 7/2016 | Willfor | B25J 9/1676 |
| 2016/0207199 A1 | 7/2016 | Kuffner, Jr. et al. | |
| 2016/0257000 A1 | 9/2016 | Guerin et al. | |
| 2017/0120449 A1 * | 5/2017 | Matsunami | B25J 9/1671 |
| 2018/0144459 A1 * | 5/2018 | Hamadou | G06T 7/0004 |
| 2019/0147655 A1 * | 5/2019 | Galera | G05B 19/4061 |
| | | | 345/419 |

* cited by examiner

VISUALIZATION AND MODIFICATION OF OPERATIONAL BOUNDING ZONES USING AUGMENTED REALITY

CROSS-REFERENCE TO RELATED APPLICATIONS

This application claims the benefit of the priority date of U.S. Provisional Patent Application Ser. No. 62/690,125, titled DUAL CHECK SAFETY ZONE VISUALIZATION AND MODIFICATION IN AUGMENTED REALITY, filed Jun. 26, 2018.

BACKGROUND

Field

This invention relates to the field of robot operating zone establishment and, more particularly, to a system which uses an augmented reality display device to visualize and modify robot operational zones and boundaries, such as safety zones, where zones are displayed and manipulated using computer graphics overlaid on a real-world view, the graphics are continuously updated as the device/user position is tracked, and overlay of zones over real-world objects happens automatically.

Discussion of the Related Art

Industrial robots are very complex machines which are capable of performing many different functions precisely and reliably. It is known to those familiar with robot installations/applications to define operational zones which define either allowed or prohibited spatial movement of the robot. Operational zones are used in many ways—including as safety zones in which robot operation is prohibited, conditional safety zones where robot operation is prohibited under a certain condition such as the presence of a human operator, permitted zones which are zones within which a robot must remain at all times, joint position check zones which monitor joint position for accepatiblity, and interference check zones. However, establishment of operational zones for robots and multi-robot systems using previous techniques is difficult and time consuming.

In existing systems, operational zones and boundaries are difficult to set up and visualize, and editing of operational zones is completely menu driven and complicated. In addition, "4D visualization" systems cannot show overlap of operational zones with real-world objects unless computer-based object models of the objects are imported. Furthermore, every change to an operational zone boundary requires restarting the robot controller in order to evaluate the operational zone, so changes to optimize the zones are very time consuming.

In light of the circumstances described above, it is desired to provide an interactive augmented reality (AR) tool for visualizing and modifying robot operational zones.

SUMMARY

In accordance with the teachings of the present disclosure, an augmented reality system for visualizing and modifying robot operational zones is disclosed. The disclosed system includes an augmented reality (AR) device such as a headset in communication with a robot controller. The AR device includes a processor running software for the AR display and modification of the operational zones. After establishing communication with the robot controller and downloading any existing operational zones, the AR device is registered with the robot world coordinate frame via detection of a visual marker or other technique. The AR device and software then display operational zones overlaid on real world images of the robot and any existing fixtures, where the display is updated as the user moves around the robot work cell with the AR device. Control points on the virtual operational zones are displayed and allow the user to resize and reshape the operational zones by moving the control points. The robot can be operated during the AR session, such as to run the robot's programmed motion and evaluate the operational zones. Any zone violation is highlighted in the AR display, such as by a change of color. When zone definition is complete, the finalized operational zones are uploaded to the robot controller for use in production operation of the robot.

Additional features of the presently disclosed devices will become apparent from the following description and appended claims, taken in conjunction with the accompanying drawings.

DETAILED DESCRIPTION OF THE EMBODIMENTS

The following discussion of the embodiments of the disclosure directed to a method and system for visualization and modification of robot operational zones using augmented reality is merely exemplary in nature, and is in no way intended to limit the disclosed devices and techniques or their applications or uses.

It is known in the industrial robot user community to define safety zones and other types of spatial zones which are relevant to the motion of the robot—such as a zone which the robot is prohibited from entering. These safety zones and other types of zones are collectively referred to herein as operational zones.

Operational zones are commonly used to establish boundaries of motion for industrial robots and other types of machines. Throughout the following discussion and the corresponding figures, the operational zones are described and shown in the context of industrial robots. However, the disclosed systems and methods are applicable not only to robots but also to any other type of machine which moves through spatial envelopes where interferences, collisions and operator safety may be a concern.

Many different types of operational zones may be established—including three dimensional (3D) volumes which define a permitted or prohibited motion space, interference check zones which establish spatial buffers around robot arms and other items, and joint position check zones which monitor robot joint positions. Operational zones are established before production operations of a robot in its workspace, and then the speed and position of the robot are continuously checked against these zones to make sure the robot is always respecting the boundaries of the defined zones.

Figure 1:
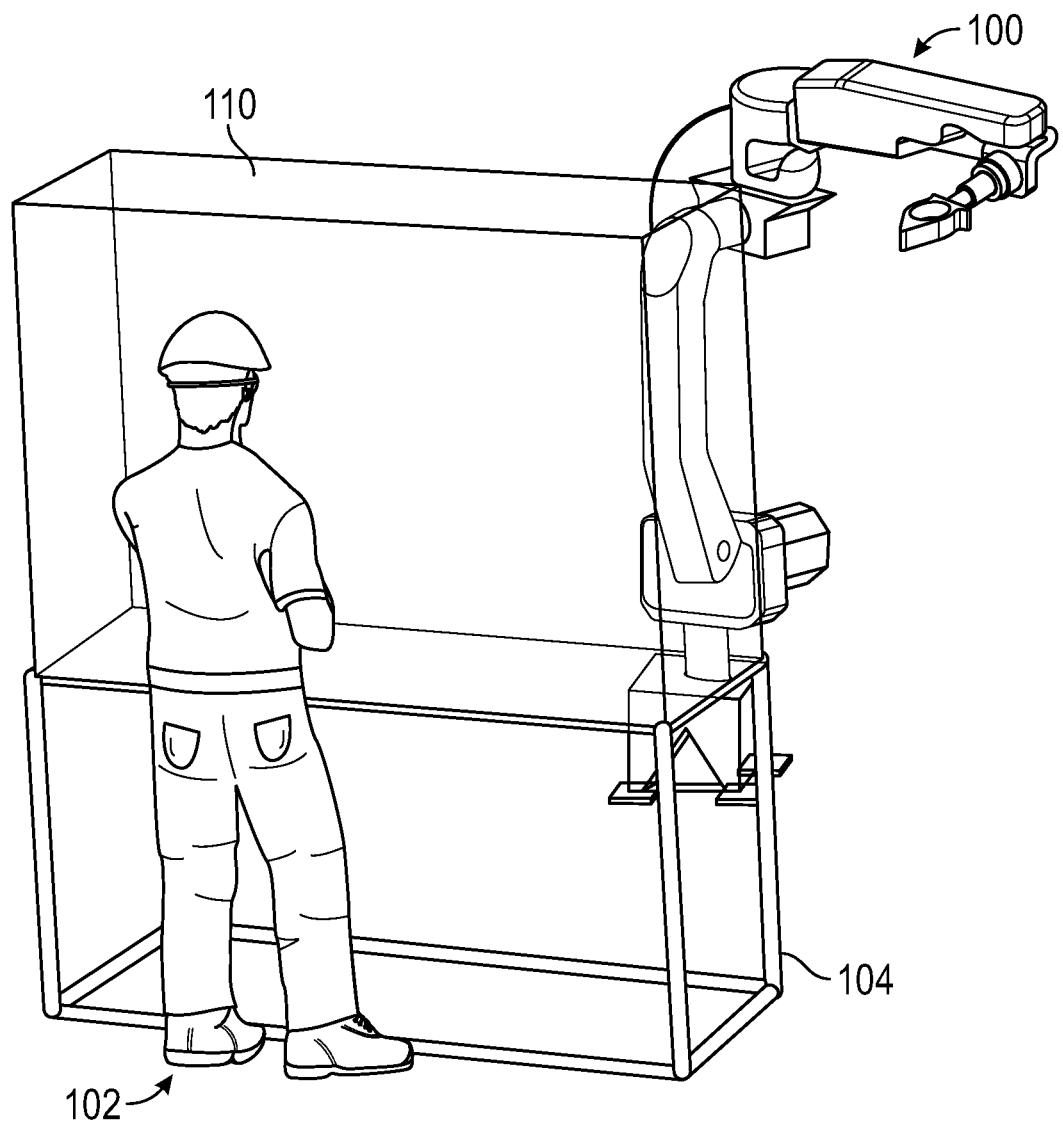
FIG. 1 is an illustration of an industrial robot, a human operator, and an operational zone established as a safety zone for protection of the operator.

FIG. 1 is an illustration of an industrial robot 100, a human operator 102, and an operational zone 110 established as a safety zone for protection of the operator 102. A table 104 serves as a stand or platform upon which a workpiece may be placed for operation thereon by the robot 100. The operational zone 110 as illustrated in FIG. 1 has a shape of a regular hexahedron, however, the operational zone 110 could have any shape—including asymmetry, non-planar surfaces, cylindrical and spherical volumes, etc. The operational zone 110 illustrated in FIG. 1 is a safety zone defining a prohibited space for the robot 100 directly above the table 104. Furthermore, the zone 110 is a conditional safety zone, meaning that the zone 110 is prohibited for robot incursion only when the operator 102 is present adjacent the table 104, as may be indicated by a floor pad (which detects weight when the operator 102 is standing on it) or a sensor (such as an optical sensor which detects blockage of a light beam). Thus, the operational zone 110 is defined such that the robot 100 is allowed to enter the zone 110 when the operator 102 is not present adjacent the table 104, and the robot 100 is prohibited from entering the zone 110 when the operator 102 is present adjacent the table 104.

The operational zone 110 of FIG. 1 is simply one example of a type of operational zone. Other types of operational zones are discussed in relation to FIGS. 2-5. Visualization and modification of the operational zones using the AR techniques of the present disclosure are discussed later.

Figure 2:
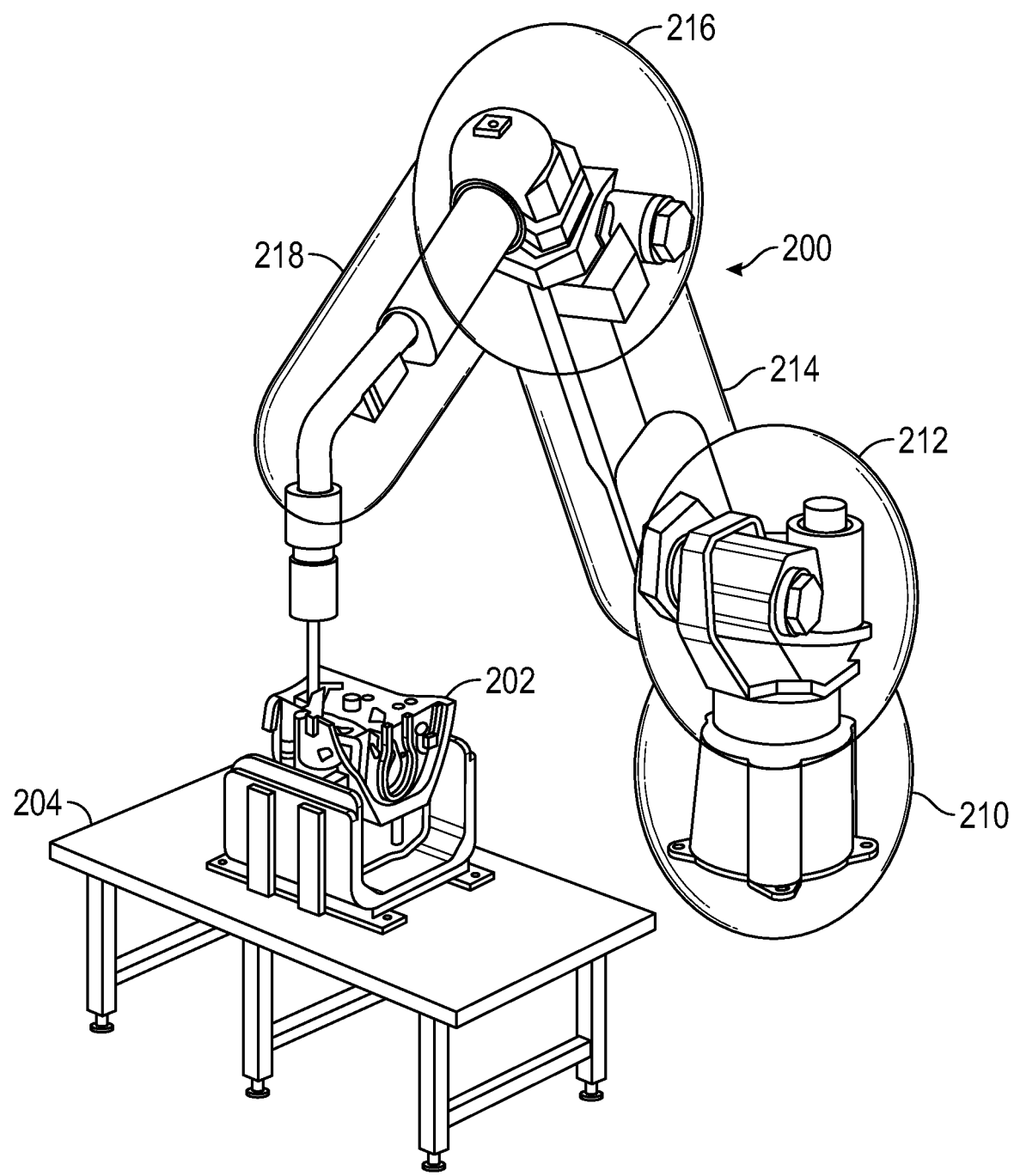
FIG. 2 is an illustration of an industrial robot operating on a workpiece located on a stand, and showing interference check zones defined around individual parts of the robot.

FIG. 2 is an illustration of an industrial robot 200 operating on a workpiece 202 located on a stand 204, and showing interference check zones defined around individual parts of the robot 200. Interference check zones 210, 212, 214, 216 and 218 are defined around a robot base, a hip joint, an inner arm, an elbow joint and an outer arm, respectively. The interference check zones 210-218 are defined as "bubbles" surrounding and providing a buffer around the physical parts of the robot 200. Each interference check zone moves with its corresponding part when the robot is articulated. For example, the zone 218 moves with the robot outer arm. The interference check zones 210-218 are then monitored during production robot operations to ensure that the zones 210-218 do not interfere with any other object in the work cell—such as the stand 204. If an interference is imminent, the motion of the robot may be slowed or stopped to prevent a physical collision.

In a preferred embodiment, the interference check zones 210-218 have shapes such as spheroid, ellipsoid or "capsule" shape (cylinder with hemispherical ends), as shown in FIG. 2. These shapes are convenient for encompassing a particular robot arm or joint while providing a buffer around the physical parts, while also being simple to define (minimal number of parameters) and easy to compute during real-time motion of the robot. Other shapes for the interference check zones 210-218 may also be used—including prismatic shapes (such as bars having a triangular or rectangular cross section).

Figure 3B:
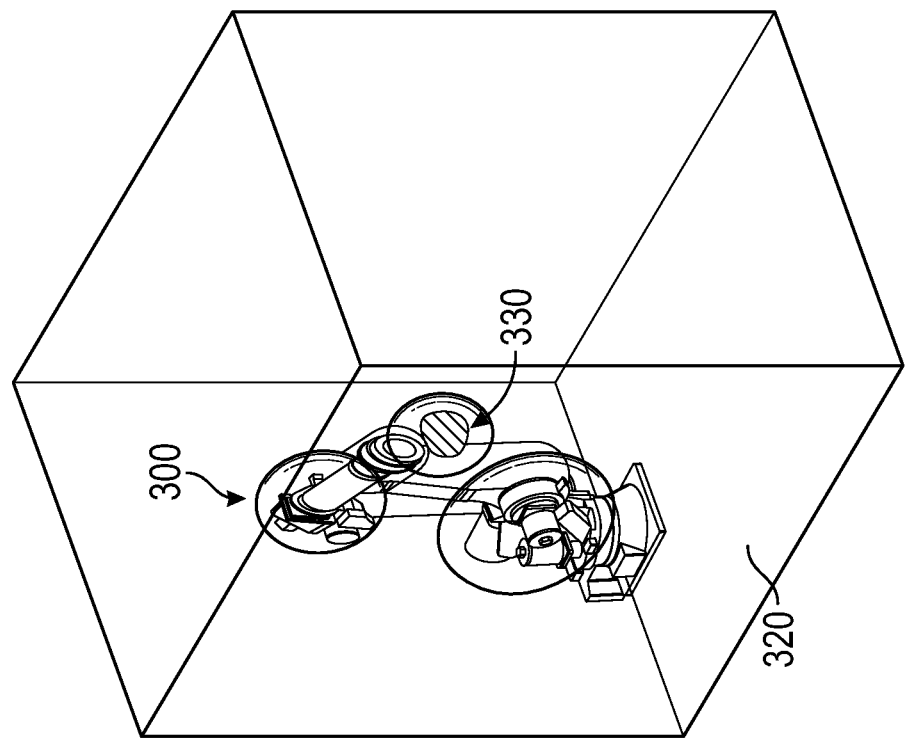
FIG. 3B is an illustration of the same robot where one of the interference check zones has violated a boundary of the permitted zone.
Figure 3A:
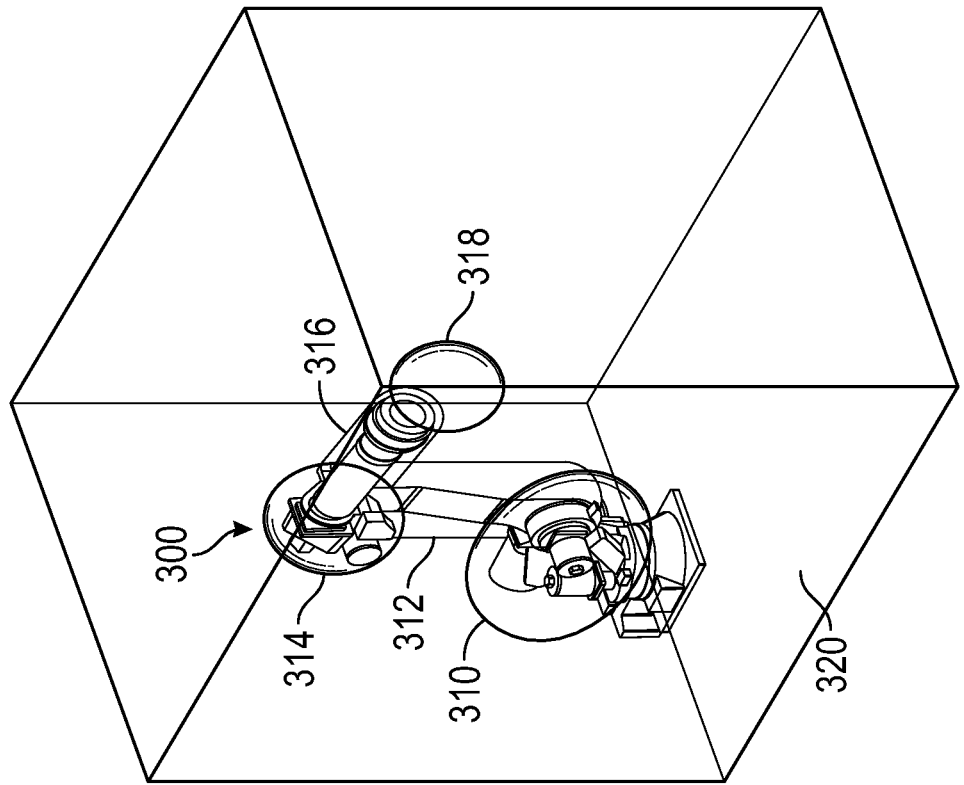
FIG. 3A is an illustration of an industrial robot with interference check zones defined around individual parts of the robot and operating within a permitted zone.

FIG. 3A is an illustration of an industrial robot 300 with interference check zones defined around each arm of the robot and operating within a permitted zone. Interference check zones 310, 312, 314, 316 and 318 are defined corresponding to individual parts of the robot 300, in the manner discussed previously with reference to FIG. 2. In FIG. 3A, a permitted zone 320 is also defined. The permitted zone 320, generally cubical in shape in this example, is a type of operational zone which defines an operational space within which the robot 300 must remain.

In FIG. 3A, the interference check zones 310-318 are all positioned within the volume of the permitted zone 320. That is, in the current position of the robot 300, none of the interference check zones 310-318 intersect with any of the outer walls of the permitted zone 320. With the interference check zones 310-318 and the permitted zone 320 defined, the robot 300 can be articulated through its programmed motions and any possible interference conditions identified. In a preferred embodiment of the present disclosure, the actual robot 300 is physically moved through its programmed motions while the interference check zones 310-318 and the permitted zone 320 are mathematically evaluated and results are displayed using the augmented reality system. However, it is also possible to simulate the motions of the robot 300, the interference check zones 310-318 and the permitted zone 320.

FIG. 3B is an illustration of the robot 300 where one of the interference check zones has violated a boundary of the permitted zone 320. In FIG. 3B, the robot 300 has rotated on its base so that the interference check zone 318 (representing the wrist and tool) intersects with an outer wall of the permitted zone 320, as indicated by reference numeral 330. The interference condition at 330 is preferably highlighted by changing the color of the interference check zone 318 and/or the permitted zone 320, or by a localized visual indicator in the vicinity of the interference condition, or a combination of these. When an interference condition is identified as in FIG. 3B, the user may respond by reprogramming the motion of the robot 300 to prevent the interference, or by expanding the size of the permitted zone 320. If the size of the permitted zone 320 is expanded in the software simulation, then a corresponding change may be necessary in the physical work cell, where a safety fence might be moved back, for example. In any case, the definition, visualization and interaction of interference check zones with a permitted zone are illustrated in FIGS. 3A and 3B.

Figure 4B:
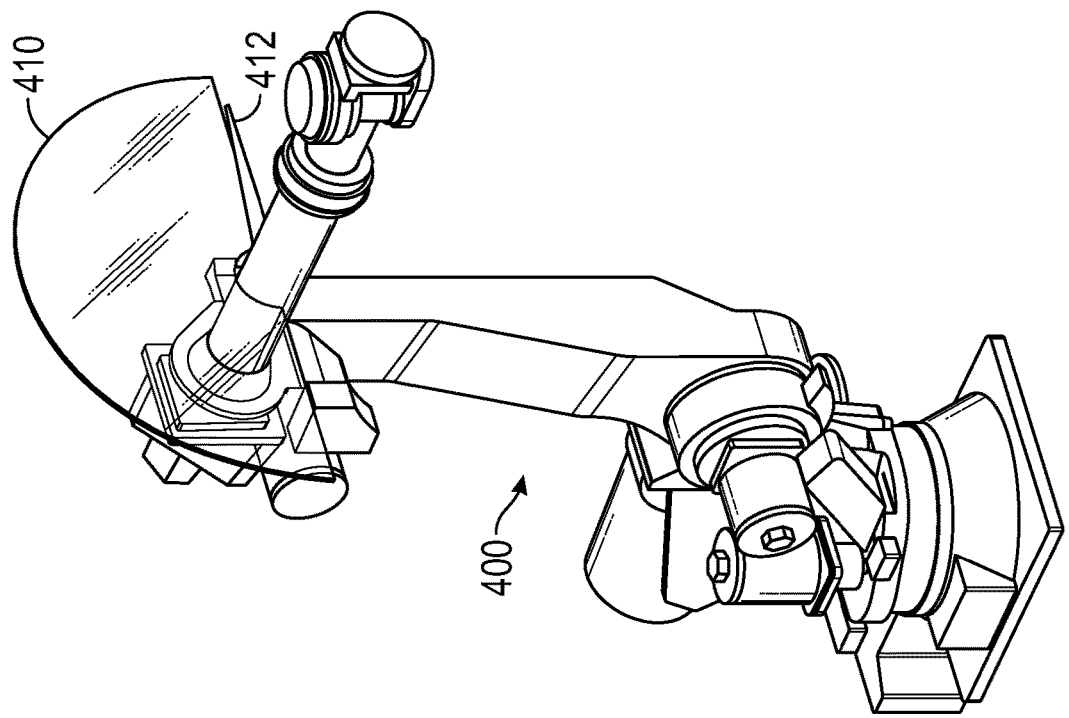
FIG. 4B is an illustration of the same robot where the joint position check zone limit is exceeded.
Figure 4A:
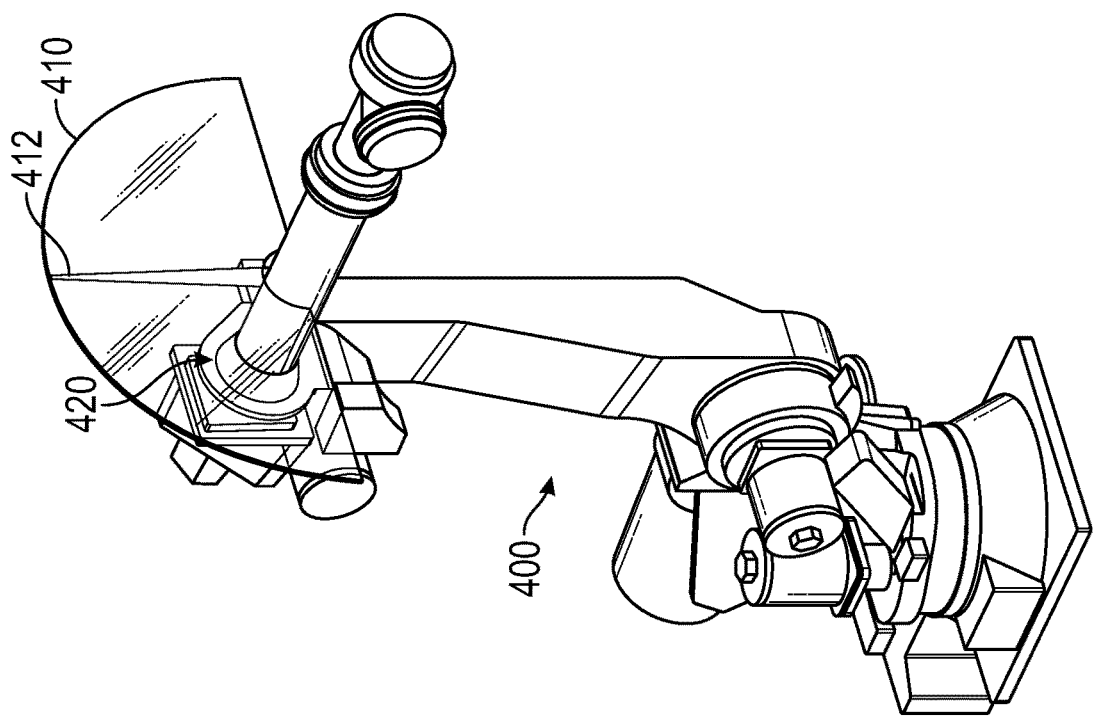
FIG. 4A is an illustration of an industrial robot with a joint position check zone defined for a rotational joint and the joint position within zone limits.

FIG. 4A is an illustration of an industrial robot 400 with a joint position check zone 410 defined for a rotational joint 420 and the joint position within zone limits. The joint position check zone 410 is another type of operational zone which may be created, visualized and modified using the techniques of the present disclosure. The joint position check zone 410 defines the permissible angular range of the rotational joint 420, which is the joint providing rotation of the outer arm part at the elbow of the robot 400. For example, the rotational joint 420 may have a permissible angular motion of +/−88 degrees from a "home" position (vertical in FIG. 4A).

The permitted range of motion of the rotational joint 420 may be restricted to prevent kinking or twisting of an electrical cable, or based on the physical design of the joint itself, for example. In any case, the joint position check zone 410 is defined to correspond to the permitted range of motion of the rotational joint 420. In FIG. 4A, the joint position check zone 410 is near the center of its range, as indicated by a pointer 412. The acceptable status of the joint position check zone 410 may also be indicated by a green color of the sector which designates the zone 410.

FIG. 4B is an illustration of the robot 400 where the joint position check zone 410 has exceeded its limit. In FIG. 4B, the robot 400 may be attempting to perform a welding or other operation where extreme motion of the rotational joint 420 is called for. The visualization of the joint position check zone 410 allows the user to readily determine that the joint 420 has exceeded its rotational limit. This is indicated by the pointer 412, and may also be indicated by the sector changing to a red color, for example. In response to such a limit violation, if the joint limit itself cannot be expanded, then a different robot program must be defined which allows the required operation to be performed without exceeding the motion limits of the rotational joint 420.

Figure 5B:
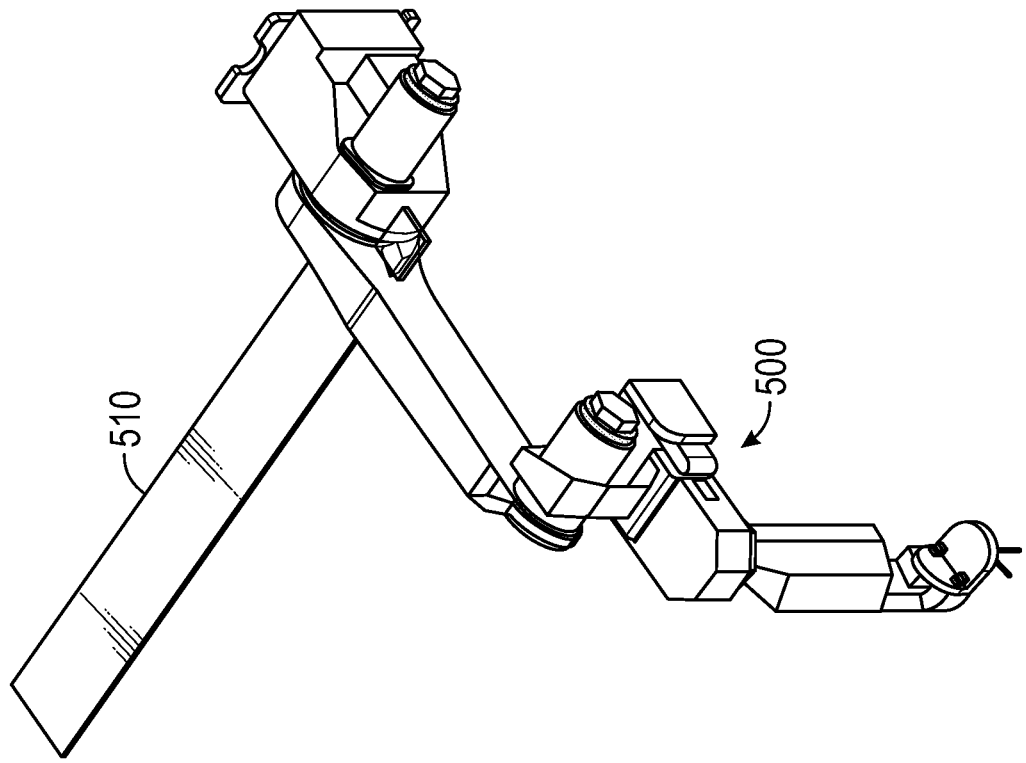
FIG. 5B is an illustration of the same robot where the joint position check zone limit is exceeded.
Figure 5A:
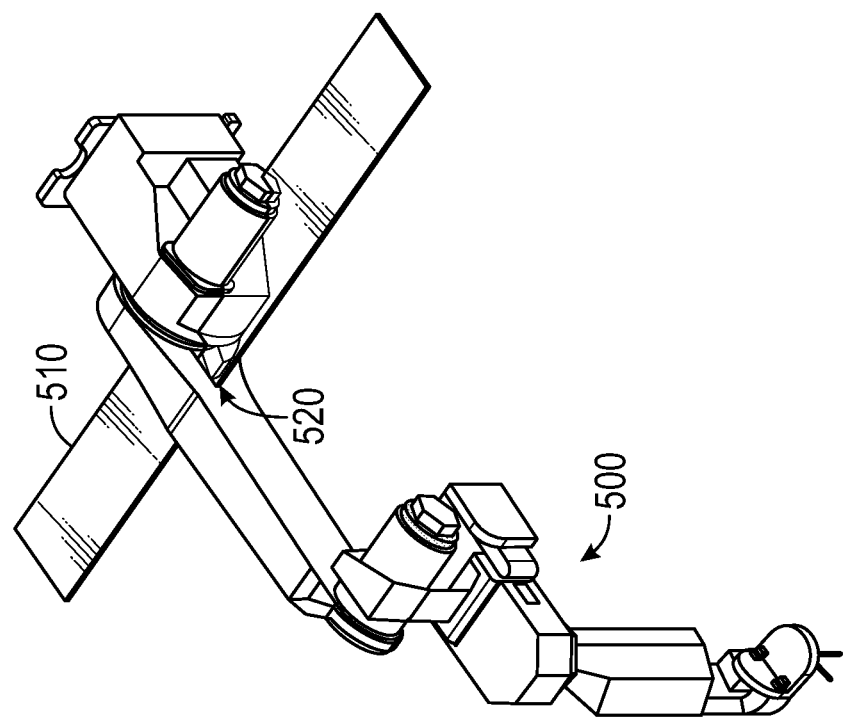
FIG. 5A is an illustration of an industrial robot with a joint position check zone defined for a translational joint and the joint position within zone limits.

FIG. 5A is an illustration of an industrial robot 500 with a joint position check zone 510 defined for a translational joint 520 and the joint position within zone limits. The joint position check zone 510 is another type of operational zone which may be created, visualized and modified using the techniques of the present disclosure. The joint position check zone 510 defines the permissible linear range of the translational joint 520, which is a specialized type of joint used in some robots, such as the robot 500. For example, the translational joint 520 may have a permissible linear motion of +/−500 mm from a "home" position (as shown in FIG. 5A).

The permitted range of motion of the translational joint 520 may be based on weight or bending moment restrictions, or based on the physical design of the joint itself, for example. In any case, the joint position check zone 510 is defined to correspond to the permitted range of motion of the translational joint 520. In FIG. 5A, the joint position check zone 510 is near the center of its range, as shown. The acceptable status of the joint position check zone 510 may also be indicated by a green color of the bar which designates the zone 510.

FIG. 5B is an illustration of the robot 500 where the joint position check zone 510 has exceeded its limit. In FIG. 5B, the robot 500 may be attempting to extend a part to a location where extreme motion of the translational joint 520 is called for. The visualization of the joint position check zone 510 allows the user to readily determine that the joint 520 has exceeded its translational limit. This may be indicated by the bar changing to a red color, for example. In response to such a limit violation, if the joint limit itself cannot be expanded, then a different robot program must be defined which allows the required operation to be performed without exceeding the motion limits of the translational joint 520.

FIGS. 1-5, discussed above, illustrate several different types of operational zones which may be used in robot motion control. These types of zones may be used individually, in combinations such as shown in FIGS. 3A and 3B, or in further combination of multiple zone types. Regardless of the type of operational zone, its shape or its intended purpose (e.g., permitted or prohibited), the spatial definition and visualization of the operational zones must be convenient and intuitive to the user—in other words, easy to define, visualize and modify all of the types of operational zones.

Operational zones have traditionally been set up using text menus on a teach pendant, and they can then be viewed using a "4D display" (3D plus motion of the robot). Because the 4D display often does not have the work cell's other real-world objects (such as stands and fixtures) depicted, it can be difficult to visualize operational zones correctly as they apply to these objects. Furthermore, the use of menus on a teach pendant to define a geometric shape of a 3D volume is often unintuitive, inconvenient and error-prone.

An augmented reality (AR) display, however, provides an intuitive way to visualize and interact with these operational zones, overlaid on images of real world objects including the robot and parts, tools and fixtures. In addition, editing zones in AR allows the user to adjust the zones—or create new ones—that are based on the real-world work cell, much more easily than through menus. This is the basis of the currently disclosed techniques.

Figure 6:
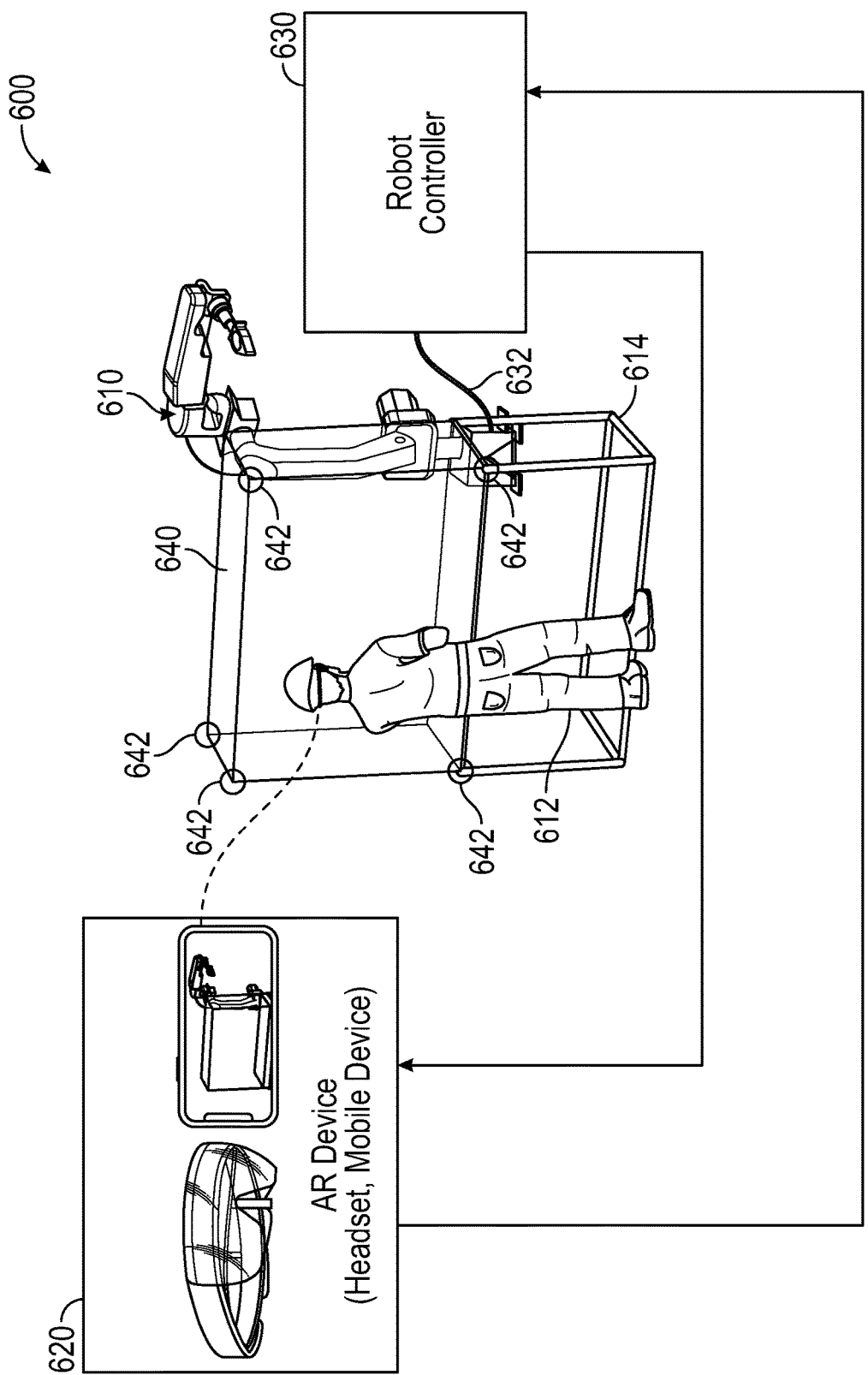
FIG. 6 is an illustration of a system for visualization and modification of robot operational zones using augmented reality, according to an embodiment of the present disclosure.

FIG. 6 is an illustration of a system 600 for visualization and modification of robot operational zones using augmented reality, according to an embodiment of the present disclosure. The system 600 includes a robot 610, an augmented reality (AR) device 620 and a robot controller 630. The robot controller 630 is in two-way communication with the robot 610, typically via a cable 632, as would be understood by one skilled in the art. The AR device 620 is in two-way communication with the robot controller 630, preferably via wireless communication such as WiFi, Bluetooth or other wireless communication means. The AR device 620 is preferably a headset wearable by a user 612, where the headset includes a processor, inertial sensors, a camera and goggles which overlay computer-generated 3D images on top of the user's view of real-world objects. When the AR device 620 is a headset, the device 620 may further include a separate keyboard or touchscreen unit for entering menu commands and input data. The AR device 620 may also be a handheld device such as a mobile phone, a tablet device or a robot teach pendant, in which case the device 620 still includes a processor, inertial sensors, a camera and a display screen, in addition to the required communications system.

In FIG. 6, the user 612 is creating, visualizing and modifying an operational zone 640 in a space above a table 614. The real-world, physical work cell where the user 612 is standing includes the robot 610 (connected to the controller 630) and the table 614. The operational zone 640 is a virtual entity which exists only in software. The AR device 620 is configured with AR zone software running on its processor. The AR zone software on the device 620 communicates (preferably wirelessly) with the robot controller 630, where the AR device 620 provides operational zone definitions and modifications to the controller 630, and the controller 630 provides robot position and other information to the AR device 620.

The operational zone 640 is characterized by a plurality of control points 642. In the case of a hexahedral operational zone such as the zone 640, the control points 642 may be located at every vertex or corner point. Many different operational zone shape templates may be provided in the AR zone software—including hexahedral, spheroidal, cylindrical, pyramidal, etc. Each different zone shape template will include different numbers and types of control points. For example, a spherical operational zone may be defined by a center point and a radius, and additional control points may be used to stretch the spherical shape in different directions. Similarly, a cylindrical zone may be defined by two end points and a radius, with additional control points or parameters available to define the shape of the ends of the cylinder. In addition, parameters such as a radius may be defined via control points as well. In the AR zone software, each operational zone is designated as having a type (such as a prohibited safety zone), and being associated with a robot part if appropriate.

The system 600 allows the user 612 to retrieve any existing operational zones from the robot controller 630, create new operational zones in the AR zone software running on the AR device 620, visualize the virtual operational zones overlaid on images of the real-world physical items in the work cell—including allowing the user 612 to walk around and view the operational zones and the physical items from different points of view, modify the operational zones by moving the control points as necessary, operate the robot 610 including running a predefined robot motion program, and commit new or modified operational zones to the robot controller 630.

Whether running on a headset device or a tablet device, the AR zone software provides several main functions to the user—including creating a new operational zone, modifying a zone, etc. Some of these functions require selecting an option from a menu, therefore the AR zone software includes menu display and selection features. When the AR device 620 is a headset device, modification of the control points 642 is preferably accomplished via user gestures—such as touching or grabbing one of the control points 642 and moving it in the desired direction in space. On a tablet device or teach pendant, control point modification may be accomplished via on-screen selection of the particular control point 642, and menu-button-based movement of the control point 642 by a designated amount in a designated direction.

For the creation of interference check zones, the AR zone software includes features designed for user convenience and productivity. Because the robot controller 630 (and thus the AR device 620) knows the pose of the robot 610 at all times—including the locations of all joint centers—the joint centers can be used for interference check zone creation. For example, a spherical interference check zone can be defined with a center at a joint J2 and requiring only a radius to be defined, or a cylindrical interference check zone can be defined with an axis extending from the joint J2 to a joint J3 and requiring only a radius to be defined. Using these features for convenient operational zone creation, along with the AR-enabled modification of control points, the user 612 can easily configure the operational zones as needed for any application.

As discussed earlier relative to FIGS. 3A and 3B, interference check zones may be used in combination with other operational zones such as permitted zones and/or prohibited zones. In this type of environment, it is desirable to run the robot 610 through its programmed motions and check for interferences. Different scenarios for performing these interference checks are discussed below.

Interferences may occur between two virtual operational zones—such as an interference check zone and a prohibited zone. In this situation, the AR zone software on the AR device 620 can perform the interference checks in real time as the robot 610 is moved through its programmed motions. Any interference which occurs can be highlighted by the AR zone software—such as by stopping the robot's motion, changing the color of a zone, providing a visual emphasis at the location of the interference, etc. If the operational zones have been communicated to the robot controller 630, then the controller 630 can also perform the interference checks between the zones as the robot is moved through its programmed motions.

Interferences may also occur between a virtual operational zone and a physical item—such as an interference check zone and the table 614. In this situation, the interference may be detected by the user 612 by watching the interference check zones as the robot moves, including walking around the work cell and viewing the robot 610 and operational zones from various points of view. If an interference is detected in this manner, the user 612 can then take the appropriate steps to resolve the interference—such as re-programming the robot's motion, or moving items to different locations within the work cell.

In order for the AR zone software on the AR device 620 to properly display the virtual operational zones overlaid on real-world items, the AR zone software must know the position and orientation of the AR device 620 at all times. This is accomplished via the camera(s) and inertial sensors (accelerometers and gyros) onboard the AR device 620, where one or more camera images of a known entity (a visual marker of known size, design and orientation) are used to establish an initial position/orientation of the AR device 620, and camera images in combination with inertial measurements are thereafter used in visual/inertial dead-reckoning calculations. These visual/inertial dead-reckoning techniques are known in the art, and are discussed further below.

Figure 7:
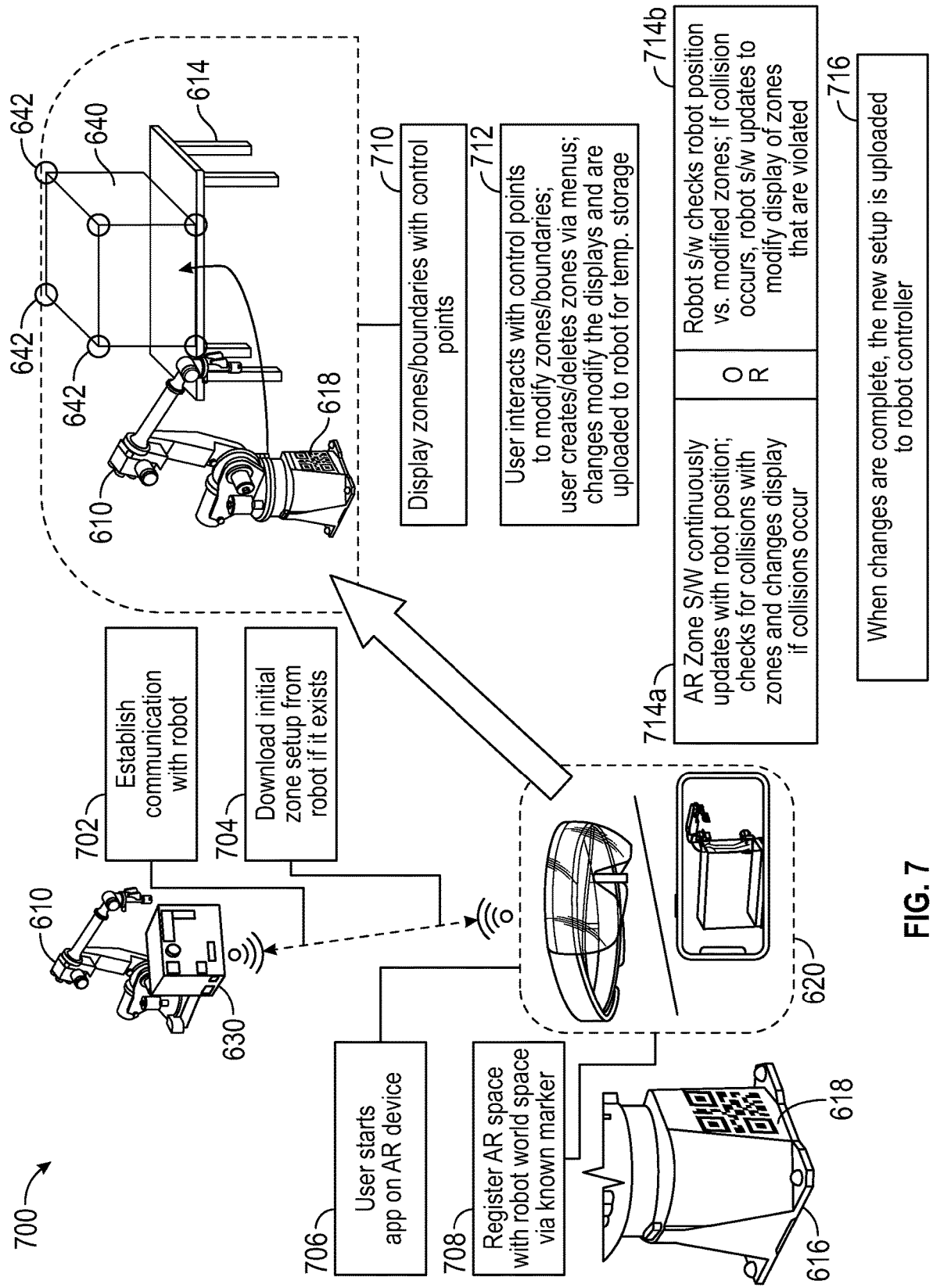
FIG. 7 is an illustrated flowchart diagram of a method for visualization and modification of robot operational zones using augmented reality, employing the system of FIG. 6, according to an embodiment of the present disclosure.

FIG. 7 is an illustrated flowchart diagram 700 of a method for visualization and modification of robot operational zones using augmented reality, employing the system 600 of FIG. 6, according to an embodiment of the present disclosure. At box 702, the AR device 620 establishes communication with the robot controller 630 via a wireless communication channel, as discussed earlier. The robot controller 630 may already have one or more operational zones defined for the particular work cell containing the robot 610. If any such operational zones exist, they are downloaded from the robot controller 630 to the AR device 620 at box 704. If no pre-existing operational zones are available, the user can proceed with the process to create, modify and visualize one or more new operational zones.

At box 706, the user starts the AR zone software application (app) on the AR device 620. At box 708, the position and orientation of the AR device 620 are registered with the "world space" which is simply a fixed coordinate system in the work cell of the robot 610. The work cell coordinate frame is known to the robot controller 630, and robot joint positions and tool center position in the work cell coordinate frame are known for all positional configurations of the robot 610. Registering the AR device 620 to the work cell coordinate frame is performed by pointing the camera in the AR device 620 at a visual marker 618 so that a plurality of images of the marker 618 are captured by the AR device 620. In practice, this is accomplished by pointing the camera of the AR device 620 at the marker 618 so that the marker 618 appears in the display of the AR device 620; natural movement of the AR device 620 (due to it being held or worn by a person) provides subsequent images of the marker 618 (which has a pattern and a location which are known to the robot controller 630 and the AR zone software) from slightly different perspectives, allowing the AR zone software to determine the position and orientation of the AR device 620 relative to the work cell coordinate frame. Other methods of registering the AR device 620 to the work cell coordinate frame, besides imaging of the visual marker 618, may be used as would be apparent to those skilled in the art.

After the position and orientation of the AR device 620 are registered with the work cell coordinate frame, inertial and visual odometry are used by the AR zone software to continuously track the position and orientation of the AR device 620 relative to the work cell coordinate frame. In this technique, the processor in the AR device 620 receives signals from accelerometers and gyros onboard the device 620 and continuously computes updated position and orientation of the device 620 based on integration of the acceleration and yaw rate signals. The position and orientation are checked and corrected based on images from the camera on the device 620, such as images of the marker 618 or other recognizable items which exist at a known location.

At box 710, the AR zone software displays on the AR device 620 any operational zones (such as the zone 640) superimposed on images of real-world items. The operational zones are virtual, meaning they exist in the AR zone software but do not physically exist. The robot 610, the table 614 and any other physical items in the work cell appear in the camera images on the AR device 620, and the AR zone software transposes the virtual operational zones so that they appear in the proper position/orientation relative to the physical items. The display of the operational zones is updated continuously so that the zones have the correct appearance from any point of view, based on the continuously updated position and orientation of the AR device 620. The AR zone software also displays the control points 642 on the operational zone 640.

At box 712, the user interacts with the control points 642 to modify the boundaries of the operational zone(s). For example, a corner of the operational zone 640 may be moved, or a radius of a cylindrical interference check zone may be changed. Control points may be modified using physical gesture commands (grab, move, etc.) when the AR device 620 is a headset device. Control points may be modified using menu commands and keystroke entry when the AR device 620 is a tablet, a smart phone or a teach pendant. Menus and menu item selection are also available on the headset device.

Still at the box 712, the user can also create new operational zones, which may be safety zones (either permissible space or prohibited space for the robot 610), conditional safety zones (for example, conditional upon the presence of a worker or the presence of a part), interference check zones related to components of the robot 610, joint position check zones (rotational or translational), or others that may be apparent to a skilled user. The operational zones may have any desired geometric shape—including lines, planes, multi-faceted volumes, spheroidal and cylindrical volumes, prismatic shapes, etc. New operational zones may be created where none existed previously (if no zones were downloaded at the box 704), or new zones may be created in addition to those already existing. When operational zones have been created and modified to the satisfaction of the user, the zones are uploaded to the robot controller 630 for temporary storage (for analysis and simulation, but not yet committed for use in production operations of the robot 610).

At boxes 714a and 714b, interference check simulations are performed for the entire programmed motion of the robot 610. These interference check simulations can be performed by the AR zone software (box 714a) or by the robot controller software (box 714b).

The interference check simulations by the AR zone software at the box 714a are performed as follows. The AR zone software on the AR device 620 instructs the robot controller 630 to move the robot 610 through its programmed motion. For example, the robot 610 may be programmed to wait for a work piece to be placed on the table 614, then perform welding operations on the work piece. At each step, the robot controller 630 commands the robot 610 to move, and also provides the new robot position to the AR zone software. From the robot position information, the AR zone software can update the position of any interference check zones, and identify any interference conditions between interference check zones and other operational zones. Interference conditions are highlighted in the AR display, and also may be configured to cause the motion of the robot 610 to stop. Also, as the robot 610 moves, the user can visually check for interferences between interference check zones defined for the parts of the robot 610 and physical items such as the table 614, where the virtual zones and the physical items are all visible in the display of the AR device 620.

The interference check simulations by the robot controller software at the box 714b are performed as follows. Operational zones—such as interference check zones defined for robot parts, and safety zones (permitted or prohibited) are uploaded from the AR zone software on the AR device 620 to the robot controller software. The robot controller 630 steps the robot 610 through its programmed motion. At each step, the robot controller 630 knows the robot position information; thus, the robot controller software can update the position of any interference check zones, and identify any interference conditions between interference check zones (which are moving with the robot parts) and other operational zones (which are fixed). Interference conditions are highlighted in a report provided by the robot controller software, and also may be configured to cause the motion of the robot 610 to stop.

At box 716, when changes to the zones are complete, the new operational zone "set up" (definitions of the zones) is uploaded or transferred to the robot controller 630. That is, when operational zone visualization and modification by the user is complete, the finalized operational zones are uploaded to the robot controller 630 and confirmed/committed for production operations. During production operations, the operational zones are checked in real time by the robot controller 630—such as, for example, to ensure that the robot does not enter a prohibited zone when an operator is present adjacent the zone.

Throughout the preceding discussion, various controllers are described and implied—for controlling motions and tasks of a robot, for operation of the AR device, etc. It is to be understood that the software applications and modules of these controllers are executed on one or more computing devices having a processor and a memory module, including algorithms configured in non-volatile memory. In particular, this includes processors in the robot controller 630 and the AR device 620 discussed above. The communication between the robots, their controllers and the AR device may be over a hard-wire network, or may use any suitable wireless technology—such as a cellular phone/data network, Wi-Fi, Bluetooth, broadband Internet, etc.

As outlined above, the disclosed techniques for visualization and modification of robot operational zones using augmented reality offer several advantages over prior art techniques. The ability of a user to quickly and intuitively view and modify operational zones in 3D space, using gesture commands rather than keyboard inputs, while simultaneously viewing the robot and other real-world items, is far superior to prior iterative techniques for defining and testing operational zones.

While a number of exemplary aspects and embodiments of the method and system for operational zone visualization and modification using augmented reality have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for visualization and modification of machine operational zones, said system comprising:
   a machine operable in a work cell;
   a machine controller in communication with the machine, said controller including a processor and memory and being configured with machine control software for controlling operation of the machine; and
   an augmented reality (AR) device in communication with the machine controller, said AR device having one or more cameras, position tracking sensors and a display, said AR device further including a processor and memory configured to run an AR zone software application;
   where the AR zone software application provides features including;
   establishing a position and orientation of the AR device relative to a work cell coordinate frame;
   continuously tracking the position and orientation of the AR device relative to the work cell coordinate frame as the AR device is moved;
   creating, displaying and modifying one or more operational zones, including providing a virtual display of the operational zones superimposed on images from the one or more cameras of the machine and other physical items in the work cell, where each of the operational zones includes control points used to define and modify operational zone location, size and shape, including control points used to define and modify corner points of hexahedral and pyramidal operational zones and control points used to define and modify length and end shape of cylindrical operational zones;
   checking for interference between operational zones, parts of the machine and the other physical items in the work cell, including checking for interference while the machine is moved through a predefined motion program; and
   transferring the operational zones to the machine controller for subsequent use during machine operations.

2. The system according to claim 1 wherein the AR device is a headset apparatus worn by a user.

3. The system according to claim 2 wherein the control points of the operational zones are manipulable via user gestures, where the user selects and moves the control points via the gestures.

4. The system according to claim 1 wherein the AR device is a smart phone, a tablet computing device or a robot teach pendant held by a user.

5. The system according to claim 1 wherein establishing the position and orientation of the AR device relative to the work cell coordinate frame includes analyzing images of a visual marker having a known design and placed at a known location in the work cell coordinate frame.

6. The system according to claim 1 wherein the operational zones include one or more of safety zones describing a fixed space within the work cell, interference check zones describing a spatial zone around parts of the machine, and joint position check zones describing an allowable joint position range.

7. The system according to claim 6 wherein the safety zones are configurable either as permissible zones defining a space within which the machine must remain, or as prohibited zones defining a space within which the machine may not enter.

8. The system according to claim 6 wherein the interference check zones have shapes which are definable relative to joint center positions which are known to and selectable from the AR zone software application.

9. The system according to claim 1 wherein the operational zones have shapes including points, lines, planes, polyhedral volumes, prismatic volumes, spheroidal volumes, and cylindrical volumes with optional hemispherical ends.

10. The system according to claim 1 wherein the position tracking sensors include one or more gyroscopes and one or more accelerometers, where the sensors provide signals to the processor in the AR device enabling continuous computation of changes in position and orientation of the AR device.

11. The system according to claim 10 wherein the virtual display of the operational zones is continuously updated based on the changes in position and orientation of the AR device.

12. The system according to claim 1 wherein checking for interference includes changing the virtual display of the operational zones when an interference is detected, including changing a color of an operational zone which is violated, and visually highlighting a location where the interference occurs.

13. The system according to claim 1 wherein the machine is an industrial robot.

14. An apparatus for visualization and modification of robot operational zones, said apparatus comprising an augmented reality (AR) device in communication with a robot controller, said AR device being a headset worn by a user and having one or more cameras, inertial sensors and a display, said AR device further including a processor and memory configured to run an AR zone software application, where the AR device continuously tracks its position and orientation relative to a robot work cell, and the AR device provides a virtual display of one or more operational zones superimposed on images from the one or more cameras of a robot and other physical items in the work cell, where each of the operational zones includes control points used to define and modify operational zone size and shape, including control points used to define and modify corner points of hexahedral and pyramidal operational zones and control points used to define and modify length and end shape of cylindrical operational zones, and the AR device also checks for interference between the operational zones, parts of the robot and the other physical items in the work cell, including checking for interference while the robot is moved through a predefined motion program.

15. A method for visualization and modification of machine operational zones, said method comprising:
   providing a machine operable in a work cell and a machine controller in communication with the machine;
   providing an augmented reality (AR) device in communication with the machine controller, said AR device having one or more cameras, position tracking sensors and a display, said AR device further including a processor and memory configured to run an AR zone software application (app);

establishing, by the app, a position and orientation of the AR device relative to a work cell coordinate frame;

continuously tracking the position and orientation of the AR device relative to the work cell coordinate frame as the AR device is moved;

creating, displaying and modifying one or more operational zones, by the app, including providing a virtual display of the operational zones superimposed on images from the one or more cameras of the machine and other physical items in the work cell, where each of the operational zones includes control points used to define and modify operational zone size and shape, including control points used to define and modify corner points of hexahedral and pyramidal operational zones and control points used to define and modify length and end shape of cylindrical operational zones;

checking for interference between operational zones, parts of the machine and the other physical items in the work cell, by the app on the AR device or by software on the machine controller, including checking for interference while the machine is moved through a predefined motion program; and transferring the operational zones from the AR device to the machine controller for subsequent use during machine operations.

16. The method according to claim 15 wherein the AR device is a headset apparatus worn by a user, and where the control points of the operational zones are manipulable via user gestures, where the user selects and moves the control points via the gestures.

17. The method according to claim 15 wherein establishing the position and orientation of the AR device relative to the work cell coordinate frame includes analyzing images of a visual marker having a known design and placed at a known location in the work cell coordinate frame.

18. The method according to claim 15 wherein the operational zones include one or more of safety zones describing a fixed space within the work cell, interference check zones describing a spatial zone around parts of the machine, and joint position check zones describing an allowable joint position range, and where the safety zones are configurable either as permissible zones defining a space within which the machine must remain or as prohibited zones defining a space within which the machine may not enter, and where the interference check zones have shapes which are definable relative to joint center positions which are known to and selectable from the AR zone software application.

19. The method according to claim 15 wherein the operational zones have shapes including points, lines, planes, polyhedral volumes, prismatic volumes, spheroidal volumes, and cylindrical volumes with optional hemispherical ends.

20. The method according to claim 15 wherein the position tracking sensors include one or more gyroscopes and one or more accelerometers, where the sensors provide signals to the processor in the AR device enabling continuous computation of changes in position and orientation of the AR device, and where the virtual display of the operational zones is continuously updated based on the changes in position and orientation of the AR device.

21. The method according to claim 15 wherein checking for interference includes changing the virtual display of the operational zones when an interference is detected, including changing a color of an operational zone which is violated, and visually highlighting a location where the interference occurs.

22. The method according to claim 15 wherein the machine is an industrial robot.

* * * * *